18

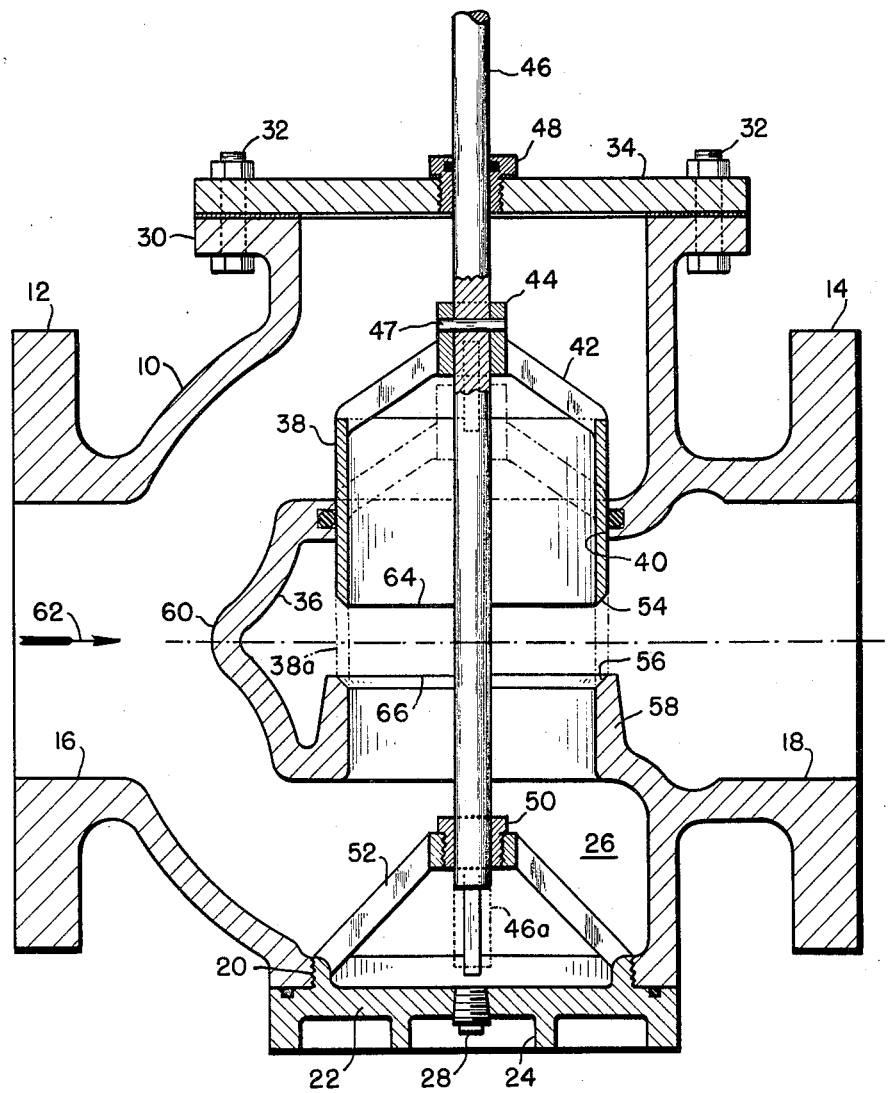

United States Patent Office 2,921,603
Patented Jan. 19, 1960

2,921,603
DOUBLE PORTED POPPET VALVE

Raymond P. Lofink, Neville Island, Pa., assignor to Chaplin-Fulton Manufacturing Company, Pittsburgh, Pa., a corporation of Pennsylvania Application February 12, 1957, Serial No. 639,806

6 Claims. (Cl. 137—625.38)

The present application relates to double ported poppet valves, particularly valves having a single hollow control element therein which adjusts the flow through both ports and on which pressure of fluid controlled by the valve is so evenly balanced as to require but the slightest force to operate it. More specifically, the control element provided in the valve according to my invention is a sliding member in the form of a thin imperforate-walled cylinder which operates with a poppet action but with both ends permanently open. With this form of valve the amount of opening that is the effective area of passage may be regulated with the greatest accuracy.

The approved practice in high-pressure gas line work is to utilize balanced valves in the line, that is valves each having two-valve closing members so that the valve may be operated independently of the gas pressure. Therefore, it has been the practice to provide double ports and double seats in those valves. However, a valve according to my invention has only a single seat. When the cylindrical control element of my valve is lifted a certain distance perpendicularly from its seat in the true manner of poppet valves, my valve is in the wide open position for which it was designed. The comparable prior art valves having two seats with two closing members require only one-half of that distance to open to maximum and thus the accuracy of their adjustment is more critical for proper operation and the precise setting necessary is proportionately more difficult to regulate and to maintain. Furthermore, it follows that the possibilities of fouling either of two exposed seats become just twice as likely compared to a single seated construction. It is manifest that a single seated construction is also easier to manufacture and to service.

According to one feature of my invention, the hollow cylindrical control element preferably has the same inside diameter as the throat of the valve seat so that as the seated open end thereof lifts away from the seat, that end and the throat of the seat, form confronting double ports of equal size, shape and capacity.

As above indicated my invention is primarily intended for handling gas, particularly high-pressure gas. The broad advantages of its double-ported, poppet operation can be equally applied to the control of steam and other elastic fluids, however, and also the inelastic ones such as water, oil and other liquids.

In the drawing, I have shown a preferred embodiment of my valve including a casing 10 having end flanges 12 and 14 for attaching the ends of the valve to gas line fittings, not shown, and these ends contain passages 16 and 18 extending in opposite directions. The valve body 10 has a threaded bottom opening 20 which is blanked off by means of a cover 22 having lugs 24 to receive a tool for screwing the cover 22 in place. The cover 22 forms one side of a main chamber 26 in the valve body and contains a threaded access opening at its center which receives a removable screw plug 28. A flange 30 at the top of the body carries a ring of hold-down bolts 32 which clamp thereto a cover 34 blanking off the head of the chamber 26.

A double-walled partition 36 within the chamber 26 is integral with the walls of the body 10 and separates the passages 16 and 18 except for a path through its hollow interior.

A cylindrical control valve element has a smooth tubular body part 38 which slides in a sealed opening 40 in the upper wall of the partition 36 into various positions for controlling the flow of gas. A spider 42 in the control valve element has four radially extending legs integral with the tubular part 38 and holding a central hub 44 in an upwardly offset position snugly fitting a valve stem 46. A pin 47 through the hub of the control element 38 fixes it to the stem 46 for movement therewith and this stem is connected at its upper end to an appropriate automatic regulator or manual adjuster, not shown. The stem 46 is of uniform diameter throughout and passes through an upper sealed pilot bushing 48 which is screwed to the cover 34, and also passes through an unsealed lower pilot bushing 50 which cooperates in keeping the valve stem in a vertical position. Thus the dead weight of the control valve element 38 and the stem 46 tends to strike a static balance.

A rigid spider 52 has a hub holding the pilot bushing 50 in a vertical and upwardly offset position from the cover 22 and for this purpose the spider 52 has four diagonally extending radiating legs which are integral at their outer end with the cover 22.

The tubular part 38 of the control element has thin imperforate walls which terminate in a conical bevel 54 at the lower end squarely confronting an inside beveled seat 56 fixed at a predetermined height in the partition 36, being machined in the end of an upstanding tubular part 58 thereof.

The inside diameters of the tubular parts 38 and 58 are preferably identical and, therefore, the passage areas through the tubular part 38 and through the throat of the seat 56 are equal in size, shape, and gas-carrying capacity.

Gas flow through the valve device can be in either direction, depending on whether the attaching flange 12 or 14 is bolted to the higher pressure side of the line. An annular nose 60 on the double wall partition 36 directly faces the passage 16 and when the flow is in the direction of the arrow 62, the passage 16 forms the inlet as preferred and the nose 60 splits the flow into equal streams which symmetrically separate along a horizontal midplane through the partition 36. When the tubular part 38 of the control element occupies the solid line position shown in the drawing, the streams reunite in counterflowing paths through the confronting ports 64 and 66, and being of equal volume and strength, they strike a balance at said midplane and reunite to flow through the passage 18 acting as outlet.

The tubular part 38 of the control element is permanently open at the upper end as well as the lower end, due to the open work of the spider 42, and thus the fluid can have access to all sides of the valve in the solid line position of the drawing. The stem 46 moves the valve control element perpendicularly with a poppet action from the seat to a wide open position determined by limit stops, not shown, and in the extreme downward position of the rod shown by the dotted lines 46a, it moves the tubular part into the seated dotted line position 38a at 56 so as to block both ports 64 and 66 and close the valve. In this closed position the effective area offered by the valve control element to gas pressure is also balanced.

It is thus apparent that the control element, when the tubular part thereof occupies the dotted lined closed position 38a, is practically statically balanced and that when it is open the counterflowing streams through the identical double ports 64 and 66 strike a dynamic balance regardless of their total volume of flow and thus surges in the gas line pressure when split into the equal paths tend to nullify or cancel one another in their effect on the control valve element.

I have shown a preferred embodiment of my invention, but it is to be understood that it may be otherwise embodied within the scope of the following claims.

I claim:

1. A double ported balanced valve arranged with a fluid inlet and outlet at opposite ends and containing a double-walled partition therebetween, the hollow interior of said partition connecting said inlet and outlet and defining a first port having a bevelled valve seat in one of the walls of said partition and facing the other wall, a valve element comprising a tubular part shiftably mounted in an opening in the other wall aligned with said first port and shiftable to seat upon said valve seat, said tubular part having an edge bevelled around its circumference to engage said bevelled seat, a valve stem concentric with said tubular part and said first port and affixed to the valve element and operable to move it off its seat whereby the separated ends of said tubular part and port form end aligned double ports enabling the hollow partition to divide and reunite a fluid stream of relatively large capacity by handling it in split paths of flow through the valve.

2. A valve according to claim 1 and comprising a casing, and in which said stem is slidably received within said casing, and a pair of pilot bushings slidably receiving said stem at spaced points and having means mounting them in fixed positions to the valve casing, said shiftable valve element including a hub fitted to said valve stem between said spaced points thereon and carrying means to solidly mount the tubular part of the valve element thereto, the aforesaid mounting means comprising spiders rigidly connecting the hub of the valve element integrally to the tubular part thereof and connecting at least one of the bushings to the valve casing.

3. A valve according to claim 1 wherein said tubular part and said first port have equal inside diameters and wherein said partition has a shaped annular nose centered to squarely confront one of said opposite ends of the valve so as to symmetrically split the incoming fluid when that end acts as the valve inlet and cooperating with said end aligned double ports to strike a substantial balance between the concentric counterflowing streams therefrom.

4. A double ported balanced valve arranged with a fluid inlet and outlet and containing an interposed double-walled partition, the hollow interior of said partition connecting said inlet and outlet and having a first port in one of the walls of said partition, a valve element comprising a tubular part shiftably mounted in an opening in the other wall aligned with said first port and shiftable into a seated position upon and confronting said first port, a valve stem concentric with said tubular part and said port and affixed to the valve element and operable to move it off its seat whereby the separated ends of said tubular part and said port form end aligned double ports enabling the hollow partition to divide and reunite a fluid stream of relatively large capacity by handling it in split paths of flow through the valve, and a pair of pilot bushings slidably receiving said valve stem and concentrically arranged to the double ports at points fixed with respect to the valve and on opposite sides of both ports.

5. A double ported balanced valve arranged with a fluid inlet and outlet at opposite ends and containing a double-walled partition therebetween, the hollow interior of said partition connecting said inlet and outlet and defining a first port in one of the walls of said partition and facing the other, a valve element comprising a tubular part shiftably mounted in an opening in said other wall aligned with said first port and shiftable into a seated position upon the face of said port, a valve stem arranged concentric with said tubular part and affixed to the valve element and operable to move it off its seat whereby the separated ends of said tubular part and port form end aligned double ports enabling the hollow partition to divide and reunite a fluid stream of relatively large capacity by handling it in split paths of flow through the valve, said tubular part and port having the same inside diameter at least adjacent said double ports to handle substantially equal quantities of flow divided between the respective split paths, and pilot bushings slidably fitting spaced points on the valve stem and fixed with respect to the valve at points beyond and concentric to the double ports.

6. A double ported balanced valve arranged with a fluid inlet and outlet at the opposite ends and containing a double-walled partition therebetween, the hollow interior of said partition connecting said inlet and outlet and defining a first port in one of the walls of said partition and facing the other, a valve control element comprising a tubular part shiftably mounted in an opening in the other wall aligned with said first port and shiftable into a seated position upon said first port, a valve stem protruding through an external pilot opening in the valve and concentrically through said tubular part to a point terminating in spaced relationship therebelow, a pilot bushing within said valve receiving the valve stem to guide the terminal thereof and having a spider rigidly mounting it at a point upwardly offset from the bottom of the valve but downwardly offset from the first port so as not to interfere with fluid flow through the throat thereof, said valve control element having a hub secured to said protruding valve stem, and a spider holding the tubular part of the control element in a downwardly offset position from the hub thereof to prevent the latter from interfering with flow through the valve control element, said partition having an external flow splitting annular nose in the midplane thereof and centered to face said inlet, said valve stem being operable to move the control element off its seat into a normal operating position whereby the separated ends of the said tubular part and first port form end aligned, double ports substantially equidistant from the midplane of the partition and cooperating with the flow splitting nose thereof to divide and reunite a fluid stream in counterflowing split paths impinging in said plane so as to balance one another.

References Cited in the file of this patent

UNITED STATES PATENTS

| 453,017 | May | May 26, 1891 |
| 2,737,979 | Parker | Mar. 13, 1956 |

FOREIGN PATENTS

| 14,409 | Great Britain | May 6, 1915 |
| 609,513 | Germany | Feb. 16, 1935 |